United States Patent [19]

Bostroem

[11] 4,370,409

[45] Jan. 25, 1983

[54] FILM IDENTIFICATION METHOD

[76] Inventor: Theodore Bostroem, 470 Park Rd. Extended, Middlebury, Conn. 06762

[21] Appl. No.: 277,038

[22] Filed: Jun. 24, 1981

[51] Int. Cl.³ .............................................. G03C 1/76
[52] U.S. Cl. .................................. 430/496; 430/501; 352/236; 354/105; 355/40
[58] Field of Search ................... 430/9, 496, 500, 501; 355/40; 352/92, 236; 354/106, 107, 108, 109, 105

[56] References Cited

U.S. PATENT DOCUMENTS

| 1,225,951 | 5/1917 | Gray | 430/501 |
| 1,225,988 | 5/1917 | Meyering | 430/501 |
| 1,275,989 | 8/1918 | Lovejoy | 354/105 |
| 1,733,481 | 10/1929 | Berman | 352/236 |
| 2,024,627 | 12/1935 | Crabtree | 430/501 |
| 2,173,505 | 9/1939 | Clewell et al. | 430/501 |
| 2,466,444 | 4/1949 | Kohler | 355/40 |
| 3,263,555 | 8/1966 | Scheib | 355/43 |
| 4,123,767 | 10/1978 | Halpern | 354/105 |

Primary Examiner—J. Travis Brown
Attorney, Agent, or Firm—Schwartz, Jeffery, Schwaab, Mack, Blumenthal & Koch

[57] ABSTRACT

A film identification method comprises the steps of providing an undeveloped photographic film with first exposure identification indicia positioned adjacent to the exposure zone of the film, and providing the film with second exposure identification indicia, corresponding to the first identification indicia, positioned within the exposure zone of the film. Additionally, a film roll identification indicia may be provided to identify the particular roll of film from which the exposures originated.

17 Claims, 12 Drawing Figures

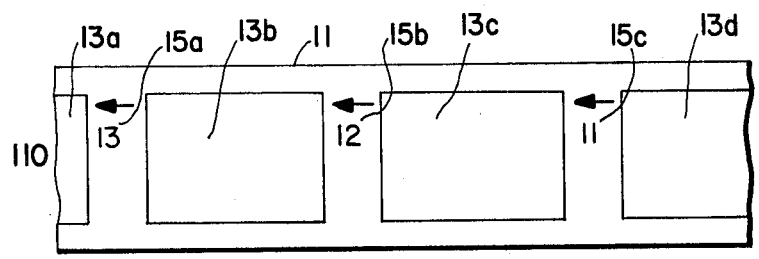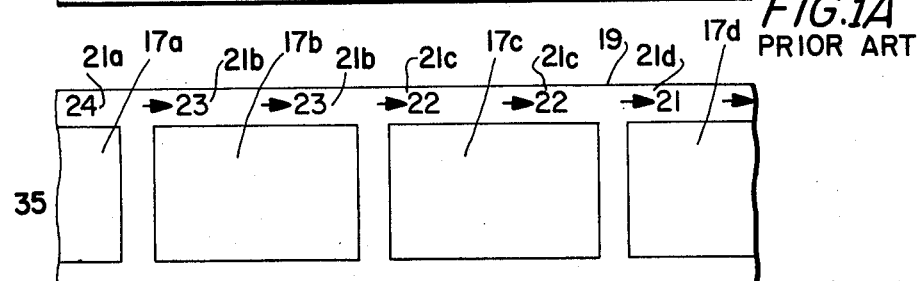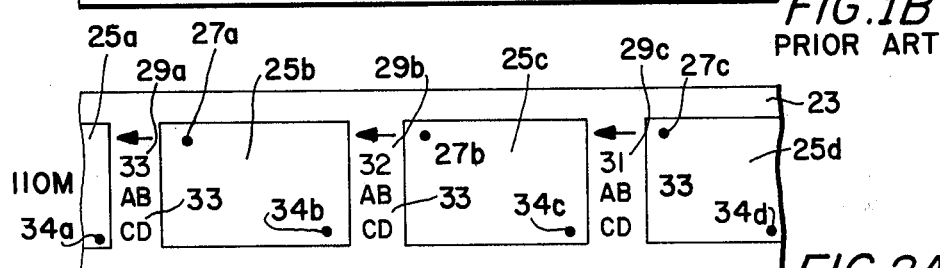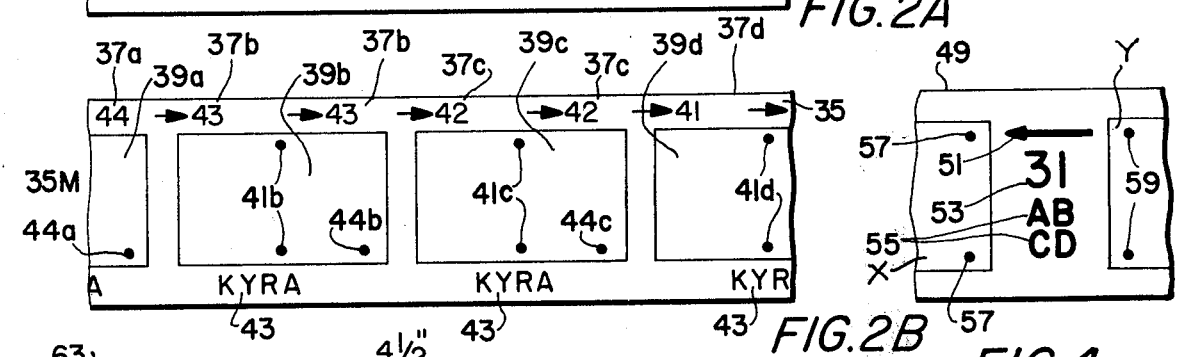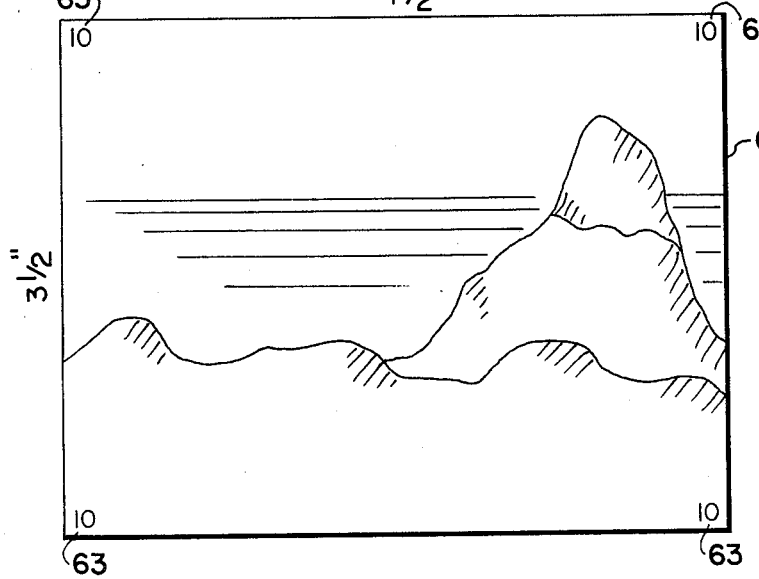

FILM IDENTIFICATION METHOD

BACKGROUND OF THE INVENTION

1. Field of the Invention

This invention generally relates to a method of identifying photographic films wherein an exposure identification number is positioned in the exposure zone of a film or slide in addition to a corresponding exposure identification number positioned adjacent to the exposure zone, and more particularly to a method of identifying the particular roll of film from which several short film segments, having a sequence of exposures, originated.

2. Description of the Prior Art

Film identification methods of the type concerned here normally utilize an exposure identification number or indicia positioned adjacent to the exposure zone of a film or slide. In the case of a roll of film providing a sequence of pictures or exposures, the prior art arrangements locate the identifying indicia in a blank strip between adjacent frames on 110 film, and on the edge of the film for 35 mm film. in the latter case, oftentimes the identification number is provided twice per exposure, to prevent confusion as to which identification number refers to the appropriate exposure if said number falls between two exposures. Typically, an arrow is placed by the identification number to indicate the exposure to which the number refers.

However, with small negatives, especially if a series of similar pictures follow one another, it is difficult to distinguish one from another without having an enlargement on hand. Even when one does have the enlarged prints of the similar subjects, it may still be difficult to match the similar prints and their negatives. This situation results in a great deal of inconvenience since the smaller the negative the greater the difficulty in determining which enlargement corresponds to the appropriate negative.

Negative films are usually delivered in short lengths, typically lengths including four (4) exposures each. While the last length of the film carries an extension or the "tail" of the film on which the film roll identification number is provided, the remaining strips, from the first until the last, have no extension or "tail" and are, therefore, not numbered. Accordingly, a further inconvenience of the known methods resides in the fact that the particular roll of film, from which short negative film strips are cut, can not be identified if the film strips have been mixed with strips coming from other rolls of film. The known identification methods only show the picture identification numbers for that particular strip but not the film roll identification number from which the strip originated.

SUMMARY OF THE INVENTION

The principal feature of the present invention is the provision of a totally new approach to identifying small photographic films and slides. In accordance with the present invention, an undeveloped photographic film is provided with a preprinted identification indicia positioned in the exposure zone of each picture of a film. The "on the picture" indicia correspond to the customary exposure zone identification indicia positioned between adjacent frames on a 110 film or on an edge of the film for a 35 mm. film, the latter usually being provided twice per exposure zone.

A further feature of the present invention is the provision that the figures, of the identification indicia positioned in the exposure zone, are of relatively diminutive size so that when the picture is printed, the indicia do not detract from the subject matter of the print, but are nevertheless easily readable. Preferably, the size of the indicia should produce figures on the prints similar to those currently used on the negatives of 110 and 35 mm films for exposure identification, which are about 1.4 mm. tall or less. The indicia positioned in the exposure zone are best placed in one or more corners of the picture for films that employ notch controlled precise stop positions when advancing the film in the camera, whereas on films that are numbered on the edge of the film, as in 35 mm films, the "on the picture" indicia can be positioned in the middle of the upper or lower border (or both) of the picture.

A further feature of the invention is to provide a film roll identification system, utilizing the space available between picture frames under the conventional arrow and exposure indicia, to identify the particular roll of film from which the negative film strip originated. There is room, for example, for four (4) conventionally sized figures in that space for 110 film and the number of available film roll identification "numbers" is increased considerably if, instead of numerals, letters are used. For 35 mm film, room is available on the edge of the film strip which is opposite to that edge on which the conventional exposure identification indicia are located. Therefore, it is possible to provide the films with an individual film roll identification indicia common to all picture frames of the film, by combining the 26 letters of the English alphabet in four (4) distinct positions as described above.

Another feature of the present invention is the provision that the undeveloped photographic film is provided with film roll identification indicia positioned in the exposure zone of each picture of the film which correspond to the film roll identification indicia positioned adjacent to the exposure zone.

Yet another feature of the present invention is to provide the "on the picture" indicia in such a manner as to be clearly legible regardless of the exposure density of the background of the picture. This is accomplished by forming the figures of the "on the picture" indicia from alternating dark and clear dots or segments. Preferably, the high contrast characteristic of the "on the picture" indicia is achieved by placing both a light and dark figure adjacent one another, each figure corresponding to the exposure zone identification indicia positioned outside of the exposure zone. In the preferred embodiment of the present invention, a single alphanumeric figure comprises the conventional exposure zone identification indicia, each of the "on the picture" figures corresponding to the conventional identification indicia.

These and other features and advantages of the invention will be apparent as the following description proceeds, with particular reference to the application drawings.

BRIEF DESCRIPTION OF THE APPLICATION DRAWINGS

FIG 1A illustrates a prior art method of numbering the negatives of a 110 film;

FIG. 1B illustrates a prior art method of numbering the negatives of a 35 mm film;

FIG. 2A illustrates the method of the present invention as applied to 110 film;

FIG. 2B illustrates the method of the present invention as applied to 35 mm film;

FIGS. 3A–3C illustrates alternative arrangements for printing exposure zone identification indicia in accordance with the present invention;

FIG. 4 represents an enlargement of the zone between two successive exposure zones of a 110 film according to the present invention;

Figure 6:
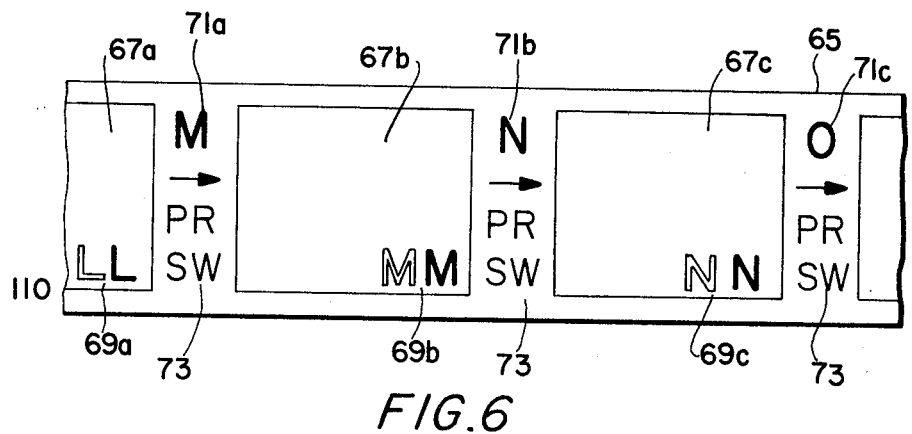
Figure 7:
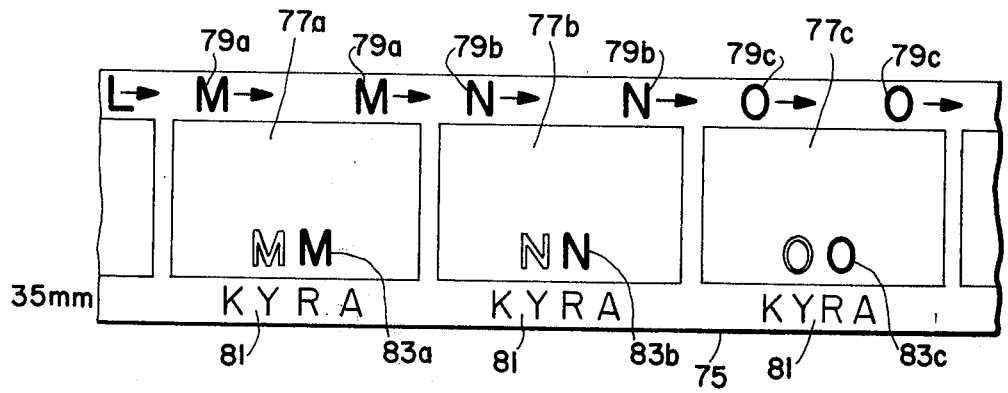
Figure 8:
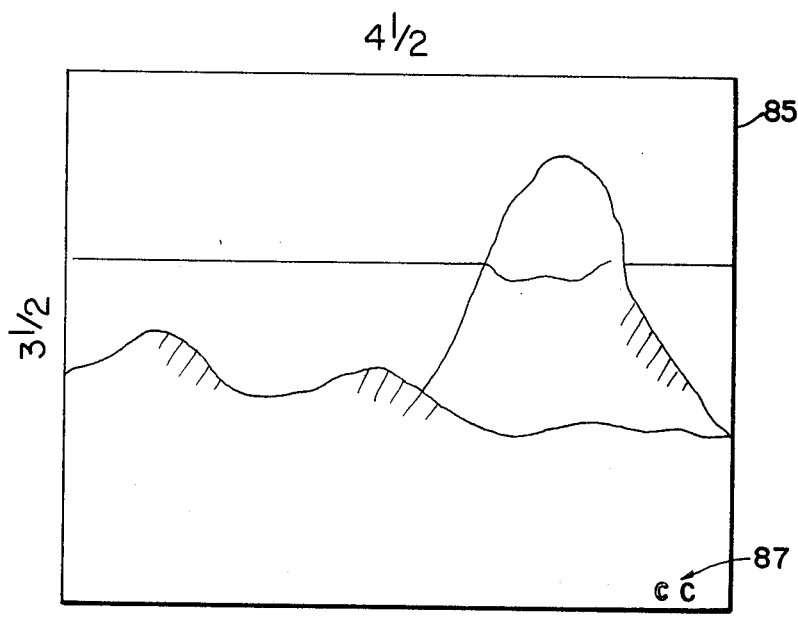

FIG. 5 diagrammatically illustrates a print according to the present invention;

FIG. 6 illustrates a preferred embodiment of the present invention as applied to 110 film;

FIG. 7 illustrates a preferred embodiment of the present invention as applied to 35 mm film; and FIG. 8 diagrammatically illustrates a print according to a preferred embodiment of the present invention.

DETAILED DESCRIPTION OF THE PREFERRED EMBODIMENTS

Referring to FIG. 1A, a prior art method for identifying each individual negative exposure on a roll of film 11 is illustrated. The film 11, which in this instance is a short strip of 110 film, includes a sequence of pictures or exposures 13a–13d which are provided with corresponding preprinted exposure identification indicia or numbers 15a–15c positioned outside of and between adjacent frames on the film 11.

Additionally, arrows are provided to indicate the exposure to which the indicia correspond.

FIG. 1B illustrates a prior art method of identifying each individual exposure zone 17a–17d on a roll or short strip of a 35 mm negative film 19. There is no room between the individual picture zones 17a–17d, so the conventional identification indicia 21a–21d are preprinted on the edge of the film. Since there is no precise way of starting the film in a camera, the identification indicia 21a–21d are provided twice for each exposure zone 17.

The method of identifying film according to the present invention is best illustrated with reference to FIG. 2A. A roll of 110 film 23 is shown with a sequence of pictures or exposures 25a–25d. In the zone of each exposure 25a–25d exposure zone identification numbers or indicia 27a–27c, respectively, are provided which correspond to the appropriate conventional identification indicia 29a–29c situated adjacent to the exposure zone of each picture 25. Due to their relatively dimutive size, the indicia 27a–27c are represented by small black circles. As illustrated, the indicia 27 are located in a single corner of the picture, although it will be understood that more than one indicia may be provided per picture. Additionally, the indicia 27 can be located on an edge of the picture.

Each exposure zone identification indicia 27 comprises figures of relatively small size so as not to detract from the subject matter of the exposure 25 when enlarged and printed, but large enough to be able to be easily identified without a magnifying glass. When utilizing standard 110 film, the film-to-print magnification is approximately 7× to provide a print having the dimensions 3.5" by 4.5". The standard prior art exposure identification indicia 29 provided on negative 110 film are approximately 1.4 mm. tall and can be easily distinguished by a person with normal sight. In order to provide an exposure zone identification indicia on the 3.5" by 4.5" print having the same size as the prior art exposure identification indicia 29, it is necessary to provide a preprinted exposure zone identification number 27 in the exposure zone of each negative 25 having a size of 0.2 mm.

In keeping with the present practice of the industry, an arrow is positioned by each conventional exposure identification number 29a–29c to indicate the appropriate exposure 25 to which the numbers 29a–29c refer. In accordance with an embodiment of the present invention, film roll identification indicia 33 are added and comprise a combination of letters common to each exposure on a given roll of film. While the letters ABCD are shown, any other combination of letters is possible, be they VRCO, EBHU, KYRA, etc. In lieu of a four (4) figure identification indicia, a five (5) figure indicia can also be employed in accordance with the present invention. Alternatively, the film roll identification indicia 33 can comprise a combination of numerals, or combinations of letters and numbers.

If four (4) figure identification indicia are employed comprised of only numerals, the number of possible combinations is 9,999. If however, only letters are employed, there are 456,976 possible combinations and if a combination of letters and numbers are used, 1,769.616 combinations are possible. If utilizing five (5) figure identification indicia comprised of only numerals, 99,999 different combinations are feasible. The use of letters provides 11,881,376 possible combinations, and if a combination of letters and numbers are employed, 60,466,176 combinations are possible.

In an alternative embodiment of the present invention, each exposure zone 25a–25d of the undeveloped photographic 110 film 23 is provided with film roll identification indicia 34a–34d, respectively. Due to their relatively diminuative size, the indicia 34a–34d are represented by small black circles although in actuality, the indicia 34a–34d on the negative 110 film should be on the order of 0.2 mm tall or less so that the indicia 34 appear approximately 1.4 mm. tall on a print. Each "on the picture" indicia 34 corresponds to the film roll identification indicia 33 positioned adjacent to the exposure zone.

FIG. 2B shows a 35 mm film strip 35, modified according to the present invention. On the film 35, the exposure identification numbers 37a–37d are provided twice, two (2) for each exposure or frame 39a–39d respectively. Bearing in mind the uneven starting of the film 35 in the camera, this arrangement ensures that at least one of the prior art identification numbers 37a–37d is positioned opposite the appropriate picture or exposure. In accordance with the present invention, relatively diminutive picture identification indicia 41b–41d are placed on the very edge of the upper or lower (or both) lateral border of the film 35, in the middle between the twofold prior art identification indicia 37. In this manner the exposure identification indicia 41b–41d on the resulting prints will never fall outside of the picture zone of a print.

For 35 mm film, individual film roll identification indicia 43 are placed on the edge of the film opposite to the edge where the twofold exposure identification indicia 37 are located. The same film roll identification indicia 43 are used for the whole film, and the drawing shows the use of the letter combination "KYRA". These letters can be placed between the propulsion holes on the film edge, which are not shown.

In an alternative embodiment of the present invention, each exposure zone 39a–39c of the 35 mm film 35 is provided with film roll identification indicia 44a-44c, respectively. Due to their relatively diminutive size, the indicia 44a-44c are represented as dots although in actuality, for 35 mm film, the indicia 44 should be about 0.35 mm tall or less on the negative to provide figures or the order of 1.4 mm tall on a print. Each "on the picture" indicia 44 corresponds to the film roll identification indicia 43 positioned adjacent to the exposure zone.

Referring to FIGS. 3A-3C, the exposure zone identification indicia according to the present invention can be preprinted in black on a white frame as illustrated by FIG. 3A, or preprinted in white on a black frame as illustrated in FIG. 3B. Further, in al alternative embodiment of the invention, each figure of the identification indicia positioned in the exposure zone comprises a dot matrix having alternating black and white dots or segments which form the figures as illustrated by FIG. 3C. When utilizing the dotted line figure, the figures are about 1.4 times larger than those illustrated by FIGS. 3A-3B, so as to ensure legibility regardless of the exposure density of the film.

To produce the matrix figure of alternating black and white segments illustrated in FIG. 3C, the dark segments are produced on the raw film in the same manner as the conventional exposure zone indicia positioned adjacent to the exposure zone as is well understood by one of ordinary skill in the art. The production of the light marks on the raw film is accomplished by one of two methods. The light marks can be chemically fixed on the prepared film, as is well understood by one of ordinary skill in the art, or, during the coating of the film with a photosensitive emulsion, localized areas of the emulsion can be scraped or depressed away, to leave transparent areas after the film is developed and fixed.

FIG. 4 illustrates an enlargement of the zone between two adjacent picture frames on a 110 film 49 modified according to the invention. Positioned within the zone is an arrow 51, a conventional picture identification indicia 53, film roll identification indicia 55, and positioned in the exposure zones X and Y are picture identification indicia 57 and 59, respectively. In this particular arrangement four exposure identification indicia are provided for each exposure zone.

Referring to FIG. 5, a 4⅛″ by 3½″ print 61, from a 110 film, is illustrated in accordance with the present invention and includes exposure zone identification numbers 63 positioned in each corner of the picture. Each figure of the exposure zone identification number 63 has a height of approximately 0.2 mm. on the original negative. When enlarged 7 times, the figures are 1.4 mm. tall. If utilizing the dot matrix arrangement illustrated by FIG. 3C, each figure is approximately 0.38 mm. tall on the negative, resulting in a corresponding zone identification number having figures which are 1.96 mm. tall on the print.

The figures on the print, resulting from placing diminutive picture identification indicia in each picture zone, must be as small as possible to cause the least possible distraction to the subject matter of the picture and yet be legible by a person with normal vision. It is believed that figures approximately 1.4 mm. tall fulfill the above-described conditions. The size of the picture of a 110 film is dimensioned 17×13 mm and the standard print is 4.5″×3.5″ or 114.3×88.9 mm. This is a magnification of about 7 times. In order to obtain 1.4 mm. tall figures on the print, the identification indicia according to the present invention have to be about 0.2 mm. tall on the negative. Additionally, the film roll identification letters identifying the particular film may also be 1.4 mm. tall.

When larger magnifications are made from a 110 film, such as 7″×5″ or 177.8×127.0 mm. which is about 10 times the size of the negative film picture, the figures positioned within the picture zone will be 2 mm. tall, which is still quite acceptable for these larger prints and, obviously still easier to identify.

In the case of a 35 mm film, the negative is dimensioned 36×24 mm and the "on the picture" figures are magnified only 4 times, so they will have to be preprinted so as to be 0.35 mm. tall on the negative.

FIG. 6 illustrates a preferred embodiment of the present invention as applied to a strip 65 of 110 negative film, having a sequence of exposures 67a-67c. In each zone of each exposure 67a-67c, exposure zone identification indicia 69a-69c, respectively, are provided which correspond to the appropriate conventional identification indicia 71a-71c, situated adjacent to the exposure zone of each picture 67. For the sake of clarity, the "on the picture" identification indicia 69a-69c are illustrated as being much larger than contemplated by the invention. In actuality, the indicia 69a-69c are sized so as not to detract from the subject matter of the picture.

In keeping with the present practice of the industry, an arrow is positioned by each conventional identification indicia 71a-71c to indicate the appropriate exposure 67 to which the conventional indicia 71a-71c refer. In accordance with one embodiment of the present invention, described above, a film roll identification indicia 73 is added in the black strip between adjacent exposure zones 67 and comprises a combination of letters common to each exposure on a given roll of film. As is understood by one of ordinary skill in the art, a single film roll identification indicia 73 can be provided for each individual film strip 65 cut from a roll of film.

A single alphanumeric figure is employed as the conventional exposure zone identification indicia 71. For good legibility, the "on the picture" indicia 69 should strongly contrast with the background of the picture and, therefore, in the preferred embodiment of the present invention, the "on the picture" indicia 69 comprises a pair of figures, each corresponding to the conventional indicia 71, one "on the picture" indicia being light, and the other "on the picture" indicia being dark. The pair of "on the picture" indicia 69 are positioned adjacent one another in a single corner of the exposure zone.

Referring to FIG. 7, the preferred embodiment, of the present invention described above, is illustrated as applied to a strip 75 of negative 35 mm film, having a sequence of exposures 77a-77c. As previously described, conventional exposure zone identification indicia 79a-79c, comprising a single alphanumeric figure, are provided twice, two (2) for each exposure or frame 77a-77c, respectively. For 35 mm film, the individual film roll identification indicia 81, are placed on the edge of the film opposite to the edge where the conventional twofold exposure identification indicia 79 are located.

In accordance with the preferred embodiment of the present invention, a pair of alternating dark and light "on the picture" identification indicia 83a-83c are placed on the very edge of the upper or lower (or both) lateral border of each exposure 77. The "on the picture" indicia 83a-83c correspond to the appropriate, conventional identification indicia 79a-79c, respectively, and are easily legible regardless of the exposure density of the background of the picture.

FIG. 8 diagrammatically represents a 4½×3½ print 85, from a 110 film, in accordance with the preferred embodiment of the present invention. A pair of relatively diminutive "on the picture" identification indicia 87 are shown, positioned in a single corner the print, the pair 87 being of alternating dark and light contrast. For 35 mm film, the print (not shown) would differ from that illustrated by FIG. 8 in that the pair of dark and light indicia would be positioned along the border of the print, not in a corner as illustrated in FIG. 8.

The improvement obtained by the present invention is that once the film is developed, the owner can look at the prints which are numbered and order, without confusion, any extra prints desired without having to consult the tiny negatives which frequently can lead to error. The fact that the prints are no longer negative, especially for an amateur photographer, is also quite helpful. The same can be said about the 35 mm films. Since the short negative film strips are well marked and cannot be confused, and there are plenty of individual film roll identification letter markings, it is practically impossible to have two films with the same marking in the hands of the same person. Further, by crowding the 5 or 6 figures of the original factory film number, it is possible to replace the four or five letter film roll identification marking of the present invention with the original factory film number providing the factory number is placed at least once on each short length or strip of the negative film, preferably one time for each exposure on the strip.

While the invention has been particularly shown and described with reference to preferred embodiments thereof, it will be understood by one skilled in the art that various changes in form and detail may be made herein without departing from the spirit and scope of the invention as defined by the appended claims.

I claim:

1. A film identification method comprising the steps of:
   providing an undeveloped photographic film with first exposure identification indicia, individual ones of which correspond to individual exposure zones, and positioning said individual ones of said indicia adjacent to the corresponding zones of said film; and
   providing said film with second exposure identification indicia, corresponding to said first indicia and of a size relatively smaller than the first indicia, positioned within the corresponding exposure zones of said film.

2. A film identification method as recited in claim 1, wherein the step of providing said second exposure identification indicia includes making said second indicia in a size such that when an exposure zone of said film is enlarged and printed, the corresponding one of said second exposure identification indicia does not detract from the subject matter of the print, but can be easily read.

3. A film identification method as recited in claim 2, wherein the step of providing said second exposure identification indicia includes producing said second indicia with a small background of contrasting color shield to make said indicia more outstanding.

4. A film identification method as recited in claim 3, wherein the step of providing said second exposure identification indicia comprises forming said second indicia of individual figures made up of alternating dark and light segments.

5. A film identification method according to claim 1, further comprising providing third indicia, common to all the exposure zones of a film, adjacent the exposure zones of the film for identifying the original roll of film from which short lengths of negative film have been cut.

6. A film identification method according to claim 5, wherein the step of providing said third indicia common to all the exposures of a film comprises forming said third indicia of at least three letters of the English alphabet.

7. A film identification method according to claim 5, in which the step of providing said third indicia comprises making a repetition of the individual factory film number.

8. A photographic film according to claim 1, in which the step of providing said second exposure identification indicia located within the exposure zones includes locating said second exposure identification indicia in at least one corner of the corresponding exposure zones.

9. A method as recited in claim 1, wherein the step of providing said second exposure zone identification indicia comprises producing figures of alternating dark and light contrast.

10. A method as recited in claim 9, wherein the step of providing said first exposure identification indicia comprises producing a single alphanumeric figure for each one of the first indicia, and the step of providing said second exposure identification indicia comprises producing a pair of alternating dark and light alphanumeric figures corresponding to each of said first exposure identification indicia.

11. A method as recited in claim 5, further comprising the step of providing a fourth indicia, corresponding to said third indicia, said fourth indicia being, positioned within the exposure zone of said film.

12. A photographic film comprising:
   an undeveloped photographic film strip having exposure zones and areas adjacent said exposure zones;
   first exposure identification indicia positioned in said areas adjacent said exposure zones, individual ones of said first indicia being associated with separate exposure zones for individually identifying said exposure zones; and
   second exposure identification indicia corresponding to said first indicia and of a size relatively smaller than said first indicia, said second indicia being disposed within said exposure zones.

13. The photographic film as set forth in claim 12 and further including third indicia common to all exposure zones of the film strip for identifying the original roll of film from which short lengths of the film strip have been cut, said third indicia being disposed adjacent the exposure zones of said film strip.

14. A photographic film as set forth in claim 13, wherein each of said third indicia comprises at least three letters of the English alphabet.

15. The photographic film according to claim 13 in which all of said indicia are black.

16. The film according to claim 13, wherein some of said indicia are figures of alternating dark and light contrast.

17. A photographic film as set forth in claim 13, and further including fourth indicia corresponding to said third indicia, said fourth indicia being positioned within the exposure zone of said film adjacent said third indicia.

* * * * *